Patented May 30, 1933

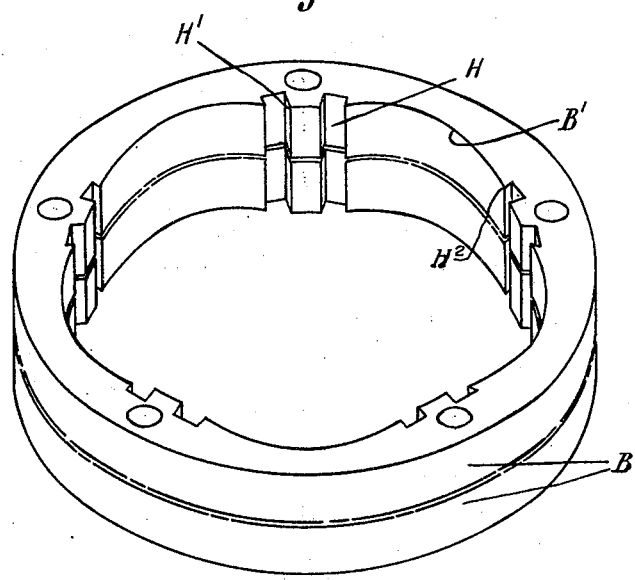

1,911,939

UNITED STATES PATENT OFFICE

PAUL BELYAVIN, OF LONDON, ENGLAND

AUTOMATIC VALVE

Application filed March 28, 1931, Serial No. 526,050, and in Great Britain May 23, 1930.

This invention relates to automatic valves of the flexible or elastic check type for use in pumps, compressors and for other purposes.

In automatic valves of the type stated, elastic strips, freely held at both ends, are flexed against arched parts on stop-plates when lifted off their seats by the pressure of passing fluid, and resume their relatively unflexed condition and bear uniformly on their seats so as to close the valve when the said fluid pressure ceases.

The invention is applicable both to elastic check valves in which the elastic strips are adapted to be seated on a cylindrical surface, as, for example, in my prior patent specification No. 1,720,993, and also to elastic check valves in which the strips are adapted to be seated on a flat surface.

Heretofore it has been found difficult in practice to provide satisfactory means for locating the elastic strips in lengthwise direction, without jamming the extreme edges of the strip. It has also been found difficult to locate the strips lengthwise in their stop plates in such a manner as to enable the strips to be slipped readily into place.

The chief object of the present invention is to overcome these difficulties, and to cheapen and simplify the construction and manufacture of elastic check valves and lengthen their life.

According to the invention, I provide automatic valves of the elastic check type in which the stop plates for the elastic strips are provided with rectangular or other grooves perpendicular to the lengthwise direction of the strips so as to provide abutments at each of the ends of the strips, whereby the strips are located lengthwise without the ends thereof being liable to jam or the strips being difficult to insert.

In accordance with another feature of the invention, I provide a method of manufacturing elastic check valves in which a plurality of stop-plates having arched parts to accommodate the elastic strips are manufactured from a single tube, or a single curved or flat plate, the surface of which is machined or otherwise made to provide the arched or recessed parts to accommodate the elastic strips, and grooves or abutments whereby the elastic strips at both ends are freely held.

In accordance with a still further feature of the invention, the elastic strips are retained in position transversely of their length by guide pieces which either may be formed by machining or otherwise made integral with the stop-plates, or may be in the form of arcuate sections manufactured from a ring, or otherwise made separately from the stop-plates.

The stop-plates may each be in the form of a ring provided with grooves for the reception of one or more rows of flexible strips axially, and any desired number circumferentially.

In order that the invention may be clearly understood, an elastic check valve embodying the same will now be described, by way of example, with reference to the annexed drawings, in which, Fig. 1 is a vertical half section of the elastic check valve;

Fig. 3 is a perspective view, to an enlarged scale, of the machined tube from which the stop-plates are manufactured.

Referring to the drawings:—

Figure 1:
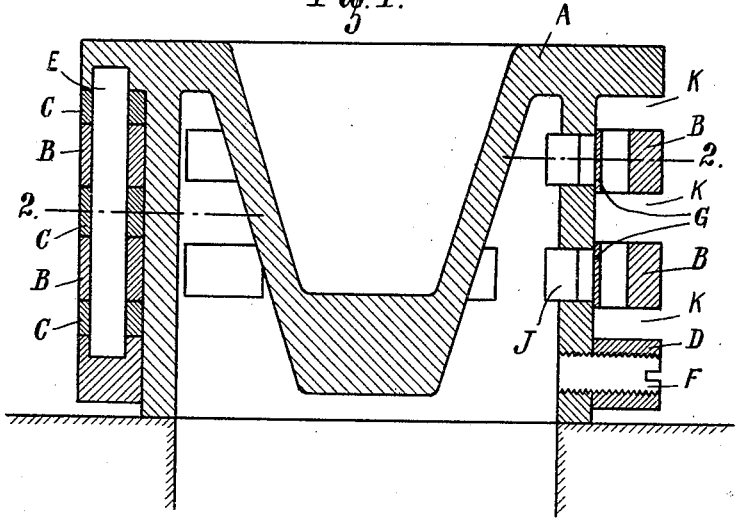
Figure 2:
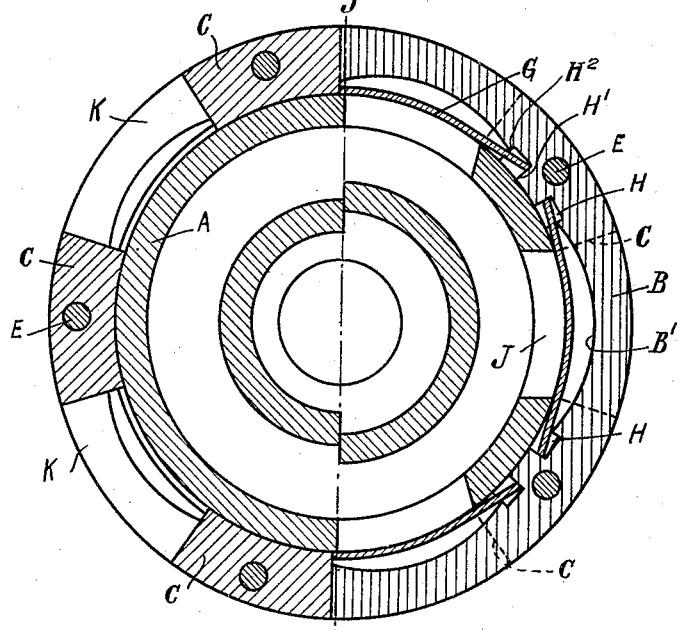
Fig. 2 is a sectional plan of the elastic check valve on the stepped line 2—2, Fig. 1.

The letter A in Figs. 1 and 2 denotes the cylindrical body of the valve provided with air passages J.

Elastic strips G are adapted to be fitted, as shown in Fig. 2, over the air passages J. These strips are adapted to rest at their ends on arcuate supports C which are carried on dowell-pins E alternately with stop-plates B, the assembly of the stop-plates, elastic strips, supports and dowell-pins being completed by an end ring D secured to the valve body A by screws F.

The elastic strips G may be manufactured from metal tape, and are preferably flat when free, as set forth in my prior specification No. 1,720,993.

The stop-plates B may, as shown in Fig. 3, be cut from a single tube, which has its bore broached or machined so as to provide arched parts B' on the inner surface of the stop-plates B together with grooves H, the outer sides H' of which form locating abutments for the ends of the elastic strips G (see Fig. 2). It will be noted that the boundaries between the recesses H and the concave surface B' of the stop member lying between them form fulcra on which the ends of the valve strip will rock as it conforms itself to either the convex surface of the valve body or the concave surface B' of the stop member.

As will be apparent from the left hand side of Fig. 2, the arcuate spaces K between the supports C permit the ready passage of air between the inside and outside of the valve body A whenever, in known manner, the elastic strips G are arched off their seats.

It will be understood that, whilst the invention has been described above with reference to an elastic check valve having a cylindrical body, it may be applied equally well to elastic check valves in which the strips are adapted to be seated on a flat surface. In this latter case, the stop-plates instead of being made from a tube or ring are made from a flat plate or bar, the under-side of which is provided with the necessary arched parts and grooves or abutments for the elastic strips.

I claim:—

1. A valve of the class described comprising a tubular inner member having a plurality of openings therethrough spaced longitudinally of the member; a plurality of separate annular stop members fitting on the inner member, each having a concave inner surface opposite one of the openings of the inner member of shorter radius than that of the curved surface of the inner member; a normally straight spring-valve strip arranged between each of said concave surfaces and the opposed opening in the inner member, each of said concave surfaces being provided with a recess at each end of its concave surface to receive the ends of the spring-valve strip when the latter is conformed to either the concave or convex surface, the boundary between each recess and the adjacent end of the concave surface forming a fulcrum on which the said spring valve strip may rock to and from the positions aforesaid; and spacer members positioning the stop members and serving to position the ends of the spring-valve strips longitudinally of the device.

2. A valve of the class described comprising a tubular inner member having a plurality of openings therethrough spaced longitudinally of the member; a plurality of separate annular stop members fitting on the inner member, each having a concave inner surface opposite one of the openings of the inner member of shorter radius than that of the curved surface of the inner member; a normally straight spring-valve strip arranged between each of said concave surfaces and the opposed opening in the inner member; and spacer members positioning the stop members and serving to position the ends of the spring-valve strips longitudinally of the device.

In testimony whereof I affix my signature.

PAUL BELYAVIN.